No. 680,136. Patented Aug. 6, 1901.
J. EVERED.
APPARATUS OR ENGINE FOR RECIPROCATING SAWS, &c.
(Application filed Jan. 15, 1901.)
(No Model.) 2 Sheets—Sheet 2.
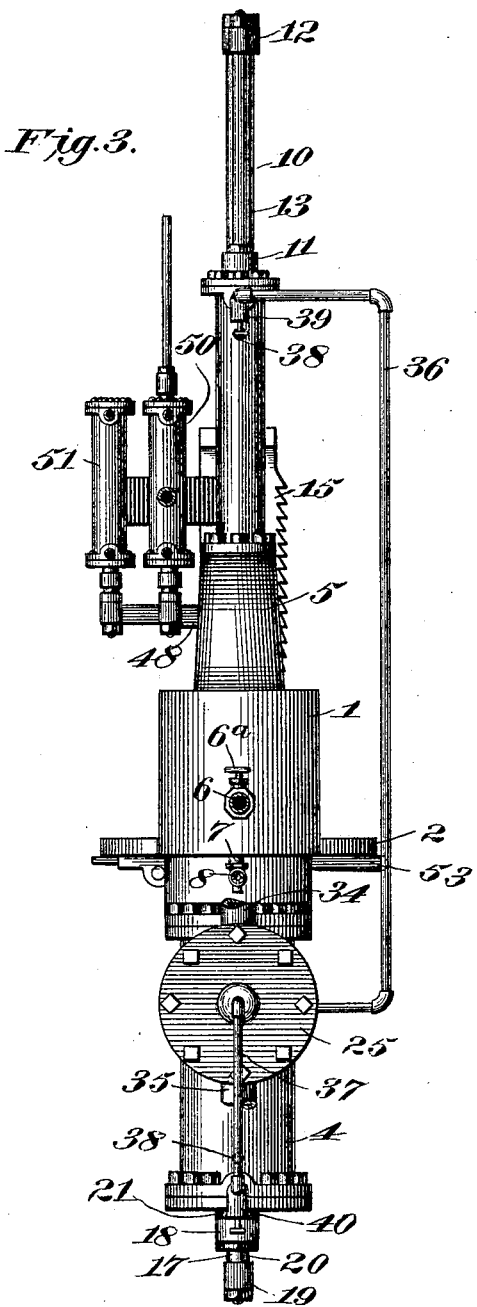
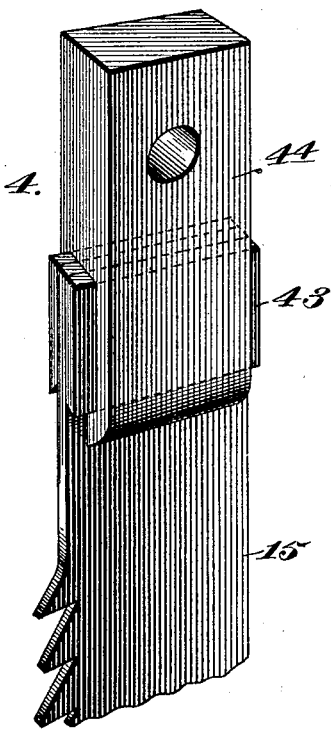
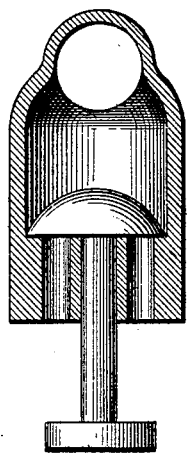
Inventor
Joshua Evered.

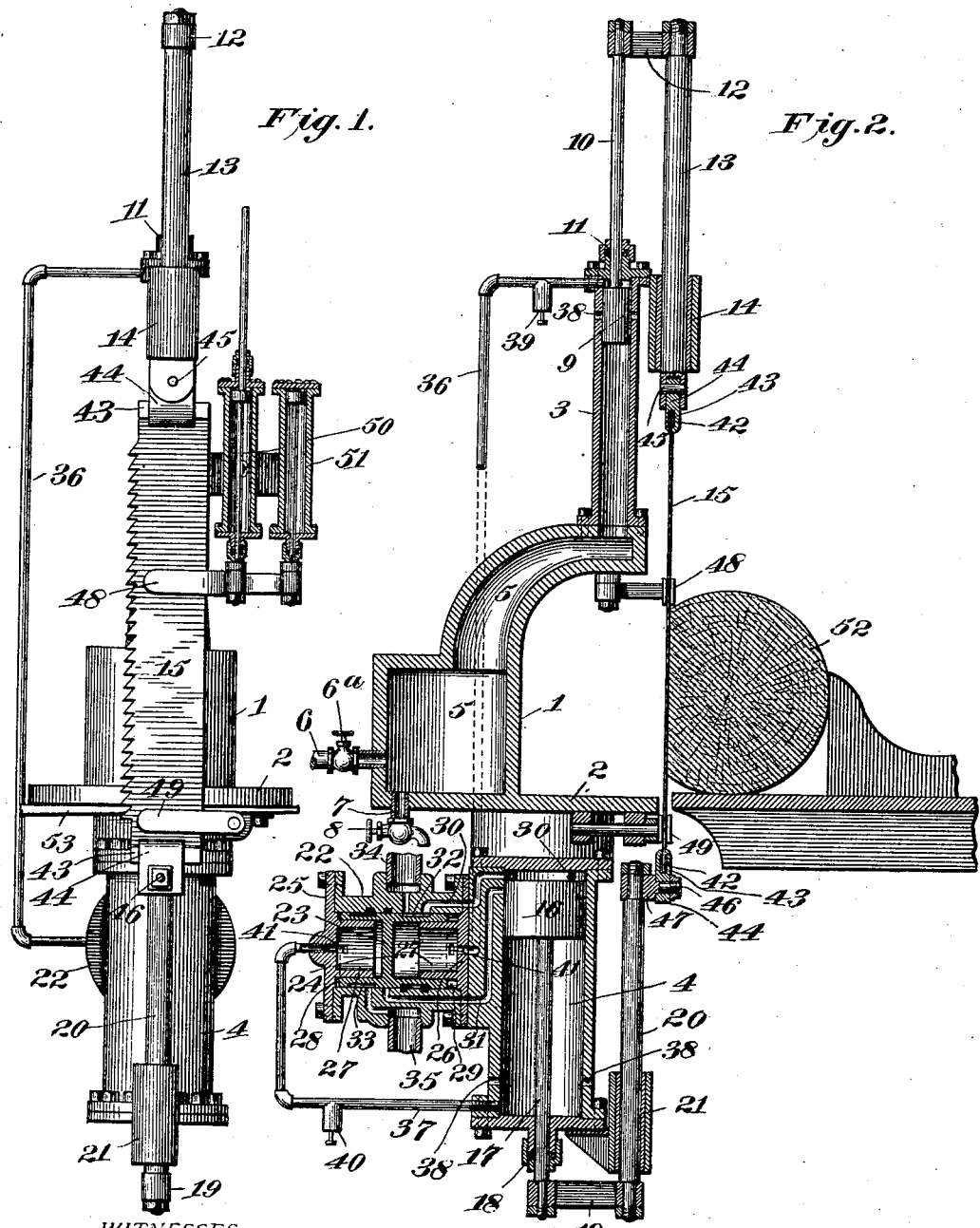

UNITED STATES PATENT OFFICE.

JOSHUA EVERED, OF DULUTH, MINNESOTA.

APPARATUS OR ENGINE FOR RECIPROCATING SAWS, &c.

SPECIFICATION forming part of Letters Patent No. 680,136, dated August 6, 1901.

Application filed January 15, 1901. Serial No. 43,408. (No model.)

*To all whom it may concern:*

Be it known that I, JOSHUA EVERED, a citizen of the United States, residing at Duluth, in the county of St. Louis and State of Minnesota, have invented certain new and useful Improvements in Apparatus or Engines for Reciprocating Saws or the Like; and I do hereby declare the following to be a full, clear, and exact description of the invention, such as will enable others skilled in the art to which it appertains to make and use the same.

This invention relates to an apparatus or engine for reciprocating saws, cutting implements, or other instruments.

It consists in certain novel constructions, combinations, and arrangements of parts, as will be hereinafter fully described and claimed.

In the accompanying drawings, Figure 1 is a side elevation of my improved apparatus looking at the same from the side in which the saw or other implement is mounted. Fig. 2 is a vertical central section through the said apparatus. Fig. 3 is a side elevation of the same looking at the apparatus from the opposite side from Fig. 1. Fig. 4 is a detail perspective view of one end of the saw, showing the head or block for holding the same in place. Fig. 5 is an enlarged detail sectional view through one of the valves in one of the air-pipes.

My invention is designed to supply mechanism for reciprocating certain implements—such, for instance, as a saw—in which the implement is grasped at its end and held taut while being moved back and forth. While I may employ other kinds of tools or other connecting means, yet for the sake of illustration I have shown my apparatus in the drawings as used for operating a saw.

The frame 1 of the apparatus is mounted upon a suitable base-plate, as 2, and carries at its upper end a pressure-cylinder, as 3, while below the plate 2 is arranged a second pressure-cylinder 4. The frame 1 is preferably made hollow to form a pressure-chamber 5, which is connected with the open lower end of the cylinder 3. The pressure in the chamber 5 is thus always maintained in the cylinder 3 also. A pipe, as 6, communicates with any source of pressure, preferably steam-pressure, admitting the same to the chamber 5, in which pipe 6 is a suitable regulating-valve, as 6ª, to regulate pressure in chamber 5. A drain-outlet, as 7, is arranged at the bottom of the chamber 5 and is provided with a drain-cock 8, so that any liquids of condensation may be drawn off from the chamber when desired. Moving in the cylinder 3 is a piston 9, having a piston-rod 10, which extends outwardly through a packing-gland 11, which closes the end of the cylinder. A cross-head 12, secured to the end of the piston-rod 10, connects the same to a sliding guide-rod 13. The guide-rod 13 engages a guide-bearing 14, secured to the frame of the apparatus, and the said rod at its lower end is provided with means for grasping the upper end of the saw 15.

In the cylinder 4 is mounted a piston 16, which is considerably larger in diameter than the piston 9, which piston is also provided with a piston-rod 17, which passes out through the cylinder-head, and a packing-gland 18, mounted thereon. The end of the piston-rod 17 is connected by means of a cross-head 19 with a sliding guide-rod 20, mounted in a bearing 21, secured to the cylinder 4. The upper end of the guide-rod 20 is adapted to grasp the lower end of the saw 15. It will thus be seen that a piston is connected with each end of the saw. The pressure of the steam or other agency is, as before stated, constantly applied in the cylinder 3, so that the piston 9 will always have a tendency to move upwardly and will therefore exert a constant upward pull upon the saw or other implement 15. When it is desired to move the saw downwardly, steam or other pressure is admitted into the cylinder 4 upon the upper side of the piston 16, and the said piston being so much larger than the piston 9 the pressure applied to the same will pull the saw downwardly against the pressure exerted in the cylinder 3. The minute pressure is exhausted from the cylinder 4 the piston 9 will be permitted to operate again to pull the saw upwardly. This arrangement is of great importance, since the piston 9 not only pulls the saw upwardly, but because of the constant pressure exerted upon it will maintain the saw in a taut condition at all times. This is very necessary in using a reciprocating saw.

Since the admission of pressure to the cylinder 4 is intermittent, it is necessary to provide a suitable valve mechanism for controlling the same. I preferably use a valve which can be automatically operated by the action of the pistons 9 and 16 in their respective cylinders. Upon one side of the cylinder 4 is secured a valve casing or chest 22, in which moves a reciprocating valve 23. The valve 23 is formed with a casing, preferably cylindrical, and a transverse diaphragm, as 24, arranged at or near its central point. Chambers are thus formed in each end of the valve separated by the partition 24. The heads 25 and 26 of the valve-chest 22 are formed with inwardly-extending portions, as 27 27, which are adapted to fit within the open ends of the reciprocating valve 23. The ends of the valve thus move back and forth in annular recesses 28 and 29, formed in the ends of the valve-casing, between the same and the inwardly-projecting cylindrical portions 27 of the chest-head. A sufficient space is left between the ends of the said cylindrical portions 27 and the diaphragm of said valve to admit of the necessary reciprocation of the valve 23. The valve is adapted to control an inlet-port 30 and an exhaust-port 31, leading to the upper end of the cylinder 4. The valve 23 is provided on its outer surface with annular ports 32 and 33, the former of which controls the inlet-ports, while the latter controls the exhaust-ports. By forming these ports 32 and 33 upon the valve, so as to extend entirely around the same, one or more inlet-ports 30 may be used, as desired, entering the cylinder at different points around its periphery, and one or more exhaust-ports 31 may also be employed. When the valve 23 is in its outer position, the annular port 32 will connect the steam-inlet 34 with the inlet-ports 30, the said valve at the same time closing the exhaust-ports 31. When the valve 23 is moved inwardly, it will close the inlet-ports and open the exhaust-ports to an exhaust-passage 35.

In order to operate the valve 23 automatically and entirely in correspondence with the movement of the pistons 9 and 16, the outer ends of both pistons are connected with the opposite ends of the valve-chest 22 by means of pipes 36 and 37. The pipe 36 preferably extends from the upper end of the cylinder 3 to the inner end of the valve-chest 22, entering the same through the inner cylinder-head 26. The pipe 37 extends from the lower end of the cylinder 4 to the outer end of the valve-chest 22, entering the same through the outer chest-head 25. Both of the cylinders 3 and 4 are provided at points a little distance from their outer ends with one or more apertures 38 38, by which air will be admitted to the outer ends of the said cylinders when their pistons are sufficiently far from said outer ends not to cover the said opening. It will thus happen that when the piston 9, for instance, moves upwardly the air in the upper end of the cylinder 3 will pass out of the openings 38 until the piston closes the said opening. The remaining air caught in the upper end of the cylinder will be compressed and forced through the pipe 36 into the inner end of the valve-casing 22 and against the partition 24 of the valve 23, so as to force the said valve to the opposite end of its stroke. When the piston 16 descends in the cylinder 4, the air therein will pass out the openings 38 until the piston closes them, when the remaining air in the cylinder will be forced through the pipe 37 into the outer end of the valve-chest and against the partition 24 of the valve therein, thereby forcing the valve to the inner end of its stroke. The valve it will thus be seen will be automatically moved back and forth in exact accord with the movement of the pistons 9 and 16. In order to prevent the inner movement of either piston from drawing the valve back again because of suction produced in the ends of the cylinders, I mount air-valves, as 39 and 40, in the pipes 36 and 37, respectively. These valves, one of which is shown in Fig. 5 of the drawings, open inwardly and will admit air to the pipes 36 and 37 when the pistons move inwardly in their cylinders until after they have passed the apertures 38.

In order to cushion the movement of the valve 23, I form apertures 41 in the inwardly-projecting cylindrical portions 27 of the chest-heads 25 and 26. These apertures will admit air to the annular recesses 28 and 29 until they are covered by the valve 23. When the valve covers one of said apertures, it will entrap sufficient air in either of the said annular recesses 28 or 29 to cushion the movement of the valve in that direction. It will be seen that by this construction the engine will be self-operating upon introducing steam-pressure into the chamber 5 and the steam-inlet 34, the valve requiring no attention.

The saw 15 may be secured to the guide-rods 13 and 20 by any suitable means; but I preferably provide the saw at each end with a dovetail head portion, as at 42, which is adapted to engage a correspondingly-shaped recess 43 43, formed in attaching pieces or blocks 44. These blocks are secured preferably in a pivotal manner to the guide-rods 13 and 20. The upper block 44 may be inserted in the bifurcated lower end of the rod 13, a pivot-pin 45 being passed through the rod and block. The block 44 at the lower end of the saw preferably engages a pivot-stud 46, carried by a block 47, removably secured to the upper end of the rod 20. By this construction the lower guide-rod 20 need not project so far over the edge of the machine as the upper guide-rod, thus avoiding the danger of bringing the said guide-rod into contact with other mechanism upon the machine. The apparatus is also preferably provided with saw-guides 48 and 49, the upper guides 48 being controlled and regulated in their height by pistons and piston-rods moving in suitable power-cylinders, as at 50 and 51. This means affords an opportunity of adjusting the upper saw-guide to correspond with the thickness of the lumber or other material being sawed. The lower guide 49 may be secured to the under side of the plate 2, as illustrated in the drawings.

The frame 1 is bowed outwardly from the saw, as seen in Fig. 2 of the drawings, so as to afford a considerable space upon the inner side of the saw for the reception of the boards or pieces cut by the saw. When a log, for instance, as 52, is presented to the saw, the pieces or boards cut therefrom will be free to fall inwardly upon the base 2 and can be readily removed from the machine.

From the above description it will be apparent that my improved apparatus is particularly well adapted for reciprocating saws or like tools where it is necessary to keep the said tools taut at all times. It will also be seen that the means for operating the mechanism is exceedingly simple and effective, it not being likely to get out of order and being positive in its action.

In using a machine of this kind for sawing lumber it is preferable to arrange the saw in such a manner that it will have a tendency to move deeper into the cut when moving in the direction in which the teeth have a cutting action and to move away from the cutting-point slightly when the saw is being retracted. I employ a simple means for accomplishing this purpose, using a wedge 53, which may be inserted beneath the base-plate 2, so as to lift one edge of the same a little more than the other and cause the saw to travel in the desired direction. This means can be easily adjusted at any time and is simple and effectual.

Having now described my invention, what I claim as new, and desire to secure by Letters Patent, is—

1. A reciprocating mechanism for saws or other tools comprising two cylinders, one of which is of larger diameter than the other, a saw or other tool for connecting the pistons in the two cylinders, means for applying pressure to the smaller cylinder for exerting constant pressure thereon, and keeping the tool taut, means for applying intermittent pressure to the larger cylinder for giving the reciprocating movement to the tool and means for controlling said latter means by pressure from the cylinders, substantially as described.

2. A reciprocating mechanism comprising a frame in which two or more pistons are arranged, slide-rods connected with the said pistons, a saw or other operating implement connecting the slide-rods, means for regulating the admission of power to one of the pistons, and means connected with each of the said cylinders for controlling automatically by pressure the power-admitting mechanism, substantially as described.

3. A reciprocating mechanism for saws comprising a frame having two or more cylinders formed therein, pistons moving in said cylinders, a saw connecting the pistons, means for admitting a constant pressure to the cylinder of one piston, for normally pulling the saw in one direction, means for admitting an intermittent heavier pressure to the cylinder of another piston for producing the desired reciprocating movement and a pressure-operated valve controlling the admission of an intermittent pressure in correspondence with the movement of the pistons, substantially as described.

4. A reciprocating mechanism for saws or other implements, comprising a frame, cylinders mounted thereon, pistons of different diameters moving in the said cylinders, means for maintaining a constant pressure upon one of the pistons, means for admitting an intermittent pressure to another piston, a saw or other implement connecting the two pistons, and a valve operated by air-pressure from the cylinders for controlling the intermittent admission of power to one of the pistons, the structure being such that the saw or other implement will be always maintained in a taut condition and will be reciprocated as required, substantially as described.

5. A reciprocating mechanism for saws or other implements, comprising a frame formed with a pressure-chamber, a cylinder connected with the said pressure-chamber, a comparatively small piston moving in said cylinder, a large cylinder secured to the base of the frame and having a comparatively large piston moving therein, a saw interposed between and connecting the said pistons, inlet-ports being provided in the said frame for admitting pressure to the large cylinder, a valve for controlling the inlet of the said pressure, and means connected with both the cylinders whereby the movement of the pistons will generate pressure to automatically operate the said valve, substantially as described.

6. An engine for reciprocating saws or like implements, comprising a frame, cylinders of different diameters mounted thereon, pistons of different diameters moving in said cylinders, guide-rods connected to the piston-rods of the said pistons, a saw or like implement interposed between the guide-rods for connecting the pistons and receiving power therefrom, means for exerting a constant pressure upon the inner end of one of the pistons, the larger cylinder in the engine being provided with inlet and exhaust ports for accommodating an intermittent pressure for operating the piston in said large cylinder, a valve for controlling these ports, and piping leading from each end of the valve to the ends of the cylinders, whereby compressed air may be employed for operating the valve in conjunction with the movement of the piston, substantially as described.

7. A reciprocating mechanism for saws comprising a frame having a large and a small cylinder formed therein, and a large and a small piston working in said cylinders, means for forcing the pistons away from each other by steam or other pressure, guide-rods connected with each of the pistons and arranged to one side of the cylinders so as to work in
5 lines parallel to the pistons, saw-grasping blocks carried by the said guide-rods, a saw connecting the said blocks, and means for controlling the pressure exerted upon the larger piston for reciprocating the saw, the structure
10 being such that all of the operating parts will be well out of the way of the material being operated upon by the saw, substantially as described.

In testimony whereof I hereunto affix my signature in presence of two witnesses.

JOSHUA EVERED.

Witnesses:
JAMES T. WATSON,
D. D. MCINNIS.